(12) United States Patent
Lepine

(10) Patent No.: US 9,560,926 B2
(45) Date of Patent: Feb. 7, 2017

(54) ELECTRONIC FORK COMPRISING A HOLLOW TOOL AND AN ELECTRONIC KEY THAT COOPERATE WITH ONE ANOTHER

(71) Applicant: SLOW CONTROL, Saint Paul (FR)

(72) Inventor: Jacques Lepine, Paris (FR)

( * ) Notice: Subject to any disclaimer, the term of this patent is extended or adjusted under 35 U.S.C. 154(b) by 276 days.

(21) Appl. No.: 13/261,996

(22) PCT Filed: Apr. 29, 2013

(86) PCT No.: PCT/FR2013/000118
§ 371 (c)(1),
(2) Date: Dec. 8, 2014

(87) PCT Pub. No.: WO2013/164522
PCT Pub. Date: Nov. 7, 2013

(65) Prior Publication Data
US 2015/0143702 A1    May 28, 2015

(30) Foreign Application Priority Data

May 2, 2012  (FR) ...................................... 12 01273
Jan. 2, 2013  (FR) ...................................... 13 00005

(51) Int. Cl.
*A47G 23/12* (2006.01)
*A47G 21/00* (2006.01)
*A47G 21/02* (2006.01)
*G01G 19/42* (2006.01)
*G01G 19/414* (2006.01)
*G01G 19/413* (2006.01)

(52) U.S. Cl.
CPC ............... *A47G 23/12* (2013.01); *A47G 21/00* (2013.01); *A47G 21/02* (2013.01); *A47G 21/023* (2013.01); *G01G 19/413* (2013.01); *G01G 19/4146* (2013.01); *G01G 19/42* (2013.01)

(58) Field of Classification Search
CPC ........ A47G 23/12; A47G 21/02; G01G 19/42; G01G 19/4146; G01G 19/413
See application file for complete search history.

(56) References Cited

U.S. PATENT DOCUMENTS 9,146,147 B1 *  9/2015  Bakhsh ................... A47G 21/02
9,442,100 B2 *  9/2016  Connor ................... G01N 33/02
(Continued)

*Primary Examiner* — Christopher Harmon

(57) ABSTRACT

An electronic fork for measuring eating rhythms comprising a conductive fork (F) head with its shoulder and its truncated handle interacting with an electronic card (20) characterized in that on the conductive fork (F) between the neck of the fork (F) and its shoulder is overmolded an insulator (11), on the insulated fork (F) and shoulder assembly is then overmolded an oblong hollow conductive handle (12), the assembly forms an oblong tool (O) inside of which is plugged an electronic key (30) made by assembling an insulated shell (32) around an electronic card (20), the electronic card (20) comprises two contact tracks (P1, P2) between which a capacitive sensor detects the closing of the circuit between the contact tracks (P1, P2), two contact blades (31a, 31b) are housed in the shell (32) in contact at one end with the contact tracks (P1, P2) and exiting the shell (32) to be housed in the position in which the key is plugged into the tool, first against the truncated body of the fork (F) and second against the conductive handle (12).

7 Claims, 3 Drawing Sheets

(56) References Cited

U.S. PATENT DOCUMENTS

| | | | | |
|---|---|---|---|---|
| 2008/0019122 A1* | 1/2008 | Kramer | ............... | A47G 19/025 |
| | | | | 362/154 |
| 2008/0276461 A1* | 11/2008 | Gold | ..................... | A47G 21/02 |
| | | | | 30/142 |
| 2014/0018636 A1* | 1/2014 | Contant | ............. | G06F 19/3475 |
| | | | | 600/301 |
| 2014/0347491 A1* | 11/2014 | Connor | ................ | A61B 5/1114 |
| | | | | 348/158 |

* cited by examiner

Fig 7
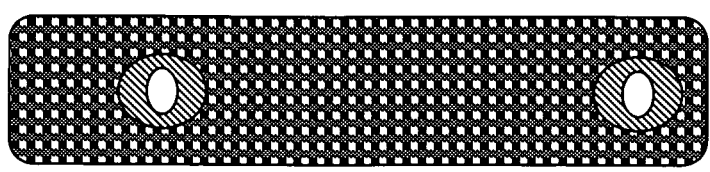
Fig 9a
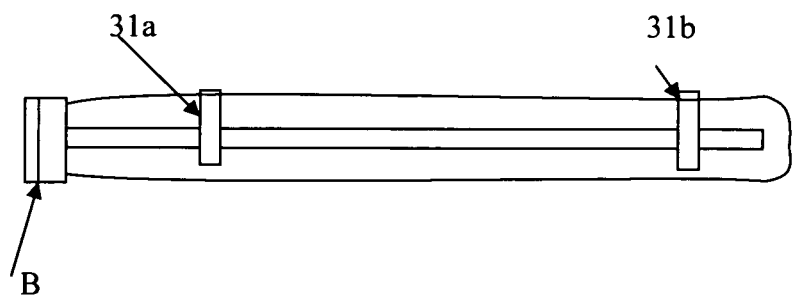
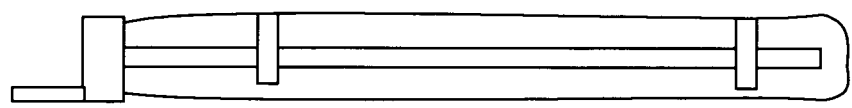
Fig 9b

ELECTRONIC FORK COMPRISING A HOLLOW TOOL AND AN ELECTRONIC KEY THAT COOPERATE WITH ONE ANOTHER

The present invention relates to an electronic fork for measuring eating rhythms. The invention specifies the particular layout of different mechanical and electronic elements to form a fork, the use of which is practical, easy and intuitive to the user.

Patent PCT/FR05/01118 is known, which describes the general principle of an electronic fork. The present invention is an improvement invention that more precisely characterizes the manufacturing and assembly mechanics of the electronic fork, with the particular layout of the different elements making up the fork. To date, no patent exists that precisely describes the way to lay out the different components to make an electronic fork that is functional throughout its cycle of use.

One principal object of the invention is to propose an electronic fork that optimally responds to the cycle of use of the fork that comprises successive turning on, using, washing, recharging and storing steps.

One object of the invention is to propose a fork with reliable measuring capabilities without altering the quality of use of the fork that has to resemble the use of a conventional fork.

One object of the invention is to propose a fork that is light, easy to store, connect, recharge and wash. A fork that is solid. A fork whose industrialization is designed to optimize its cost to the manufacturer as well as its assembly cost.

One object of the invention is to propose a fork that cooperates with electronics so as to leave maximum effective volume for the electronics to optimize the specific electronic functions that may be developed for the user.

One object of the invention is to propose a fast-eating alarm device that activates a vibrator housed in the hollow of the handle of the fork that discreetly suggests to the user that he correct his behavior.

In one principal aspect, the invention proposes an electronic card mounted in a shell, that presents a format of the key format type known as a USB key that cooperates with the handle of the fork in the form of a hollow tube that is open at the bottom, by plugging into the opening of the fork handle hollow. The invention therefore proposes to the user a fork in two cooperating parts. Except for the particular steps of washing the fork or connecting it to the computer, the two parts remain plugged together.

The attached figures represent a particular mode of the invention in which:

FIGS. 1a, 1b, 1c represent three successive views of assembling a fork according to the invention FIGS. 2a and 2b represent a top view and a bottom view of the electronic card of the fork according to the invention FIG. 3 represents a side view of the electronic card mounted in the shell according to the invention FIGS. 4a and 4b represent a front view and a side view of the finger retaining zone on the fork according to the invention.

FIG. 7 represents a contact track in a second form of the invention

Figure 1A:
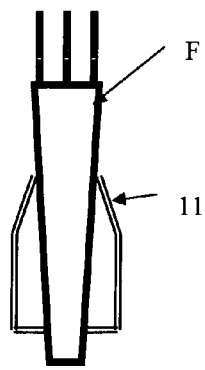
Figure 1B:
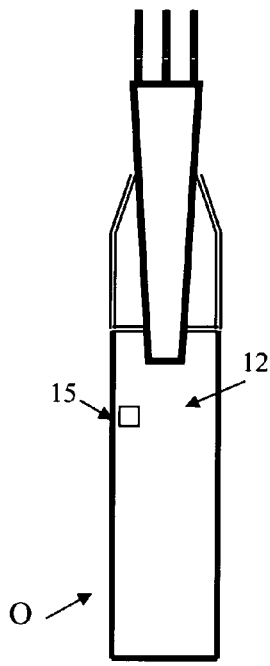
Figure 1C:
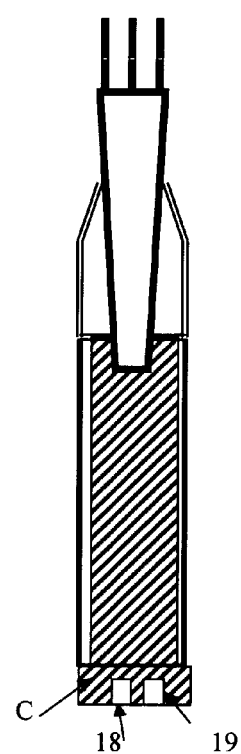
Figure 2A:
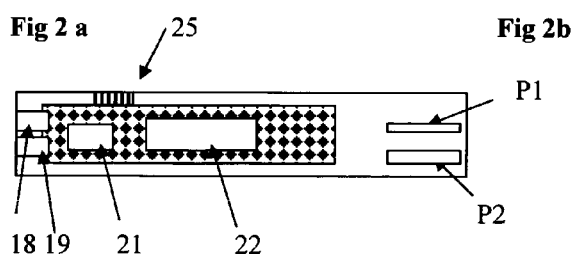
Figure 2B:
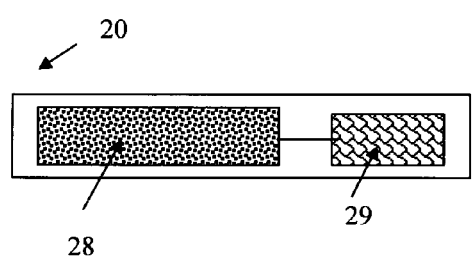
Figure 3:
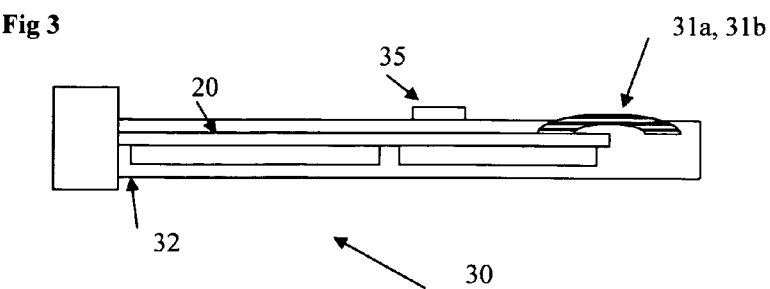
Figure 4A:
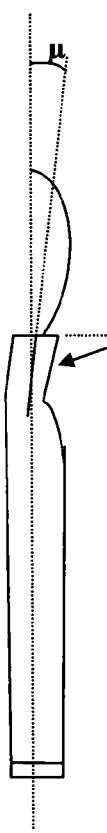
Figure 4B:
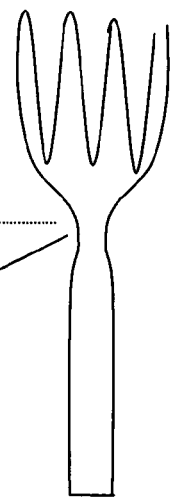
Figure 8:
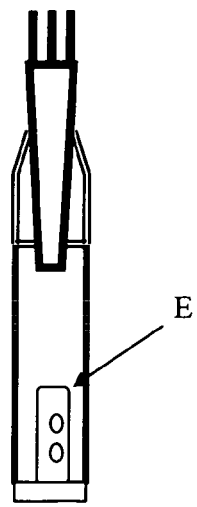
Figure 5A:
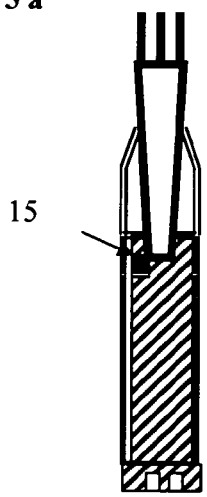
FIGS. 5a and 5b represent two successive views of positioning the electronic key in the fork handle.
Figure 5B:
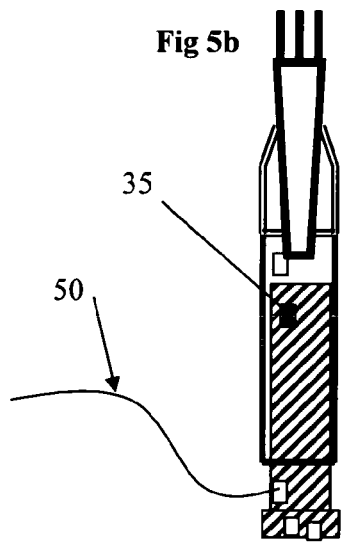
Figure 6:
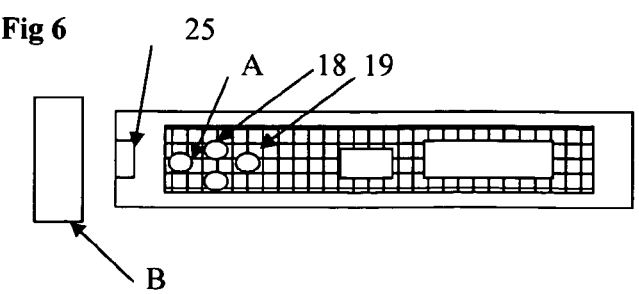
FIG. 6 represents an electronic card in a second form of the invention

FIG. 8 represents a particular form of the fork handle, particularly adapted to the mode known as Bluetooth FIGS. 9a and 9b represent an electronic key in a second form of the invention FIGS. 1a, 1b, 1c represent three successive views of assembling a fork according to the invention. The user only has two parts to handle. The electronic fork is constituted of a tool (O) that is a utensil, a fork and/or spoon, which is specially designed according to the invention, constituted only of mechanical, plastic and/or metal parts. The tool (O) is made by overmolding an insulated plastic shoulder (11) and a conductive plastic handle (12) overmolded on a conductive metal end of a fork or spoon utensil (F). The tool (O) assembly substantially adopts the form and volume of a conventional utensil but is made in a special manner. It is composed of a utensil (F) that takes the form of the head of a conventional utensil with a truncated utensil handle. A conventional utensil comprises a food-holding head, then a neck on the bottom of the head, shoulders that mark the top of the handle and its thickening and lastly the body of the handle. On the head of the utensil (F) according to the invention is first overmolded a shoulder in insulated plastic that starts at the bottom of the utensil shoulder and goes upward in the hollow of the concavity of the neck (40) of the utensil (F), see FIGS. 4a and 4b. The issue is to assemble the insulated overmolding as high as possible to prevent the finger of the user from making bad contact by touching the utensil (F). The function of the insulated plastic is therefore to prevent the hand of the user, particularly his index finger, which during a meal in the food picking position naturally presses on the fork head (F) of a fork, from touching the utensil (F). Therefore the insulated part goes up as high as possible to prevent contact of the hand with the utensil (F). Only the mouth should touch the utensil (F). Another constraint is that the overmolding area not go up too high on the utensil (F) in an area where the mouth may be in contact. In fact, the top edge of the insulated overmolding on the utensil head is an at-risk area in terms of proliferation of bacteria. Therefore the overmolding area should go down so that the user does not risk putting his mouth on the area where bacteria are at risk of proliferating. The invention should therefore propose a utensil head overmolding that on the one hand sufficiently stops the index finger of the user but that on the other hand sufficiently moves back the insulated top edge on the utensil (F). The invention therefore proposes an imaginative and inventive solution which is to house the top edge of the insulated overmolding in the hollow (40) of the utensil (F) neck. The neck (40) of the utensil (F) according to the invention thus presents two characteristics, which are 1—in front view the downward narrowing and arching of the fork head (F) that is the food holding area, to progressively go from the food holding area to the utensil handle area, 2—the angularity ($\mu$) of the food holding axis with the utensil handle axis that is between 12° and 22°. In this manner, the overmolding that adopts the shape of the utensil offers a natural obstacle to the index finger that abuts against an overmolding area (41) forming an index finger advance obstacle by proposing an added thickness of at least 1 mm that forms an obstacle to the advance of the index finger. The invention therefore proposes a top insulated overmolding edge of at least 1 mm positioned in the neck of the utensil (F), with a utensil holding angularity ($\mu$) of between 12° and 22°. The bottom overmolding edge of the insulated plastic shoulder (11) is positioned at the low height of the shoulder of the fork (F). It can adopt a particular line so as to define an esthetic form that will stand out with two different colors of conductive and insulated plastic. From the shoulder area, to the bottom of the handle is overmolded a hollow tube in a general shape, a handle in conductive plastic (12) that will constitute the fork handle and that will cooperate with the electronic card. Another solution that the conductive plastic overmolding is proposing is a conductive tube in anodized aluminum. Said conductive tube is mounted integrally with the insulated fork end head. The integration is done by any mechanical, chemical, permanent or removable means. The form of these two solutions is the same. Only the industrial manufacturing and assembling processes change. The outer overmolding shape adopts a substantially ovoid section that provides good utensil strength. The inner overmolding shape of the utensil presents a substantially ovoid constant section that will house the electronic key that will be plugged in the fork handle in translation according to the handle axis. The tool (O) therefore presents a perforated oblong shape on the bottom. In the bottom hole is engaged the electronic key (30) that cooperates with the tool (O) both mechanically and electronically, see below. FIGS. 2a and 2b represent a top view and a bottom view of the electronic card of the fork according to the invention. On a first side of this electronic card (20) is mounted the electronic circuit with, in particular, its silicon chip (22) and capacitive sensor (21). On this side, the card also comprises two contact tracks (P1, P2) that are connected to the electronic circuit of the card, which is designed such that the capacitive sensor (21) detects when the circuit is closed between P1 and P2. As explained above and below, the circuit is closed between P1 and P2, when and only when the user holds the conductive handle (12) of the fork on the one hand, and when he carries the fork (F) head to his mouth. As described below, the first contact track (P1) is connected by a conductive circuit to the conductive handle (12) of the fork, and the second contact track (P2) is connected to the conductive fork head (F). The electronic card (20) presents a rectangular oblong shape. On a small side of the first side of the electronic card (20) are positioned the user interfaces that are an On-Off pushbutton (18) and lamps known as warning light-emitting diodes (19). The second side of the electronic card comprises a battery pack (28) and an alarm (29). The alarm (29) is a vibrator and/or a microphone. The positioning of the vibrator in the fork handle body offers a discreet interactive device that easily and subtly warns the user that he has exceeded the ingestion speed recommended by his physician. In fact, as represented in FIG. 2a, the electronic card presents on its fan a connection socket (25) known as a USB connector that connects a cable (50) that will connect the card to a computer that will then enter into communication with the network with a remote server. This communication enables data to be sent from the fork to the remote server and enables personalized alarm settings to be sent to the fork. As represented in FIGS. 5a and 5b, the lateral positioning on the bottom provides easy access to the socket connection (25) by gently taking the key out of the tool (O) handle. By fully pushing the key (30) down into the handle of the tool (O), the socket is protected by the tool (O) handle. The tool can then be washed in water without risk of the fork electronics being altered. The conductive handle of the fork (12) comprises a hole positioned closer to the insulated shoulder, which has two functions. A first function is to promote the flow of water when washing the handle alone without the electronic key; a second function is to serve as an attachment clip in cooperation with a complementary protuberance (35) of the electronic key (30). Therefore by plugging the key fully into the handle body, the protuberance (35) is wedged into the fixation hole (15) of the handle (12) thus ensuring that the key is completely held in the handle. To remove the key from the handle, the user presses on the protuberance (35) and removes the wedging element that creates the temporary fixation. The electronic card (20) is thus assembled in a shell (32). The shell (32) is made by assembling several parts, particularly a body and cap. The cap (B) is preferentially made in an elastomer material, so as to be able to activate the on-off push button (18), and is transparent so as to allow the warning light-emitting diodes (19) of the electronic card to be visible. The assembly formed by the electronic card (20) assembled in the shell (32) therefore forms the electronic key (30), see FIG. 3. This electronic key cooperates with the tool (O). This cooperation is done by a plug system integrated in the electronic key (30). The plugs are made of conductive elastic contact blades (31a, 31b) that are each assembled respectively in the shell (32) in contact at a first end with the contact tracks (P1, P2) of the electronic card (20). When the electronic key is plugged into the hollow of the tool (O), the contact blades (31a, 31b) each come at a second end respectively in contact with the fork (F) and with the conductive plastic of the handle (12). In the manner of an electrical socket, the contact blades (31a, 31b) thus each come from one side in contact with the contact tracks P1, P2 of the electronic card, inside the shell (32) and pass to the outside of the shell (32) to press against the head of the fork (F) and the conductive handle (12) respectively. The head of the fork (F) is insulated from the conductive handle (12). FIG. 6 represents an electronic card in a second form of the invention. In this form, the layout of the electronic components on the electronic key is slightly different. In fact, the light-emitting diode lamps (19) and the on-off button (18) are positioned in the middle of the card so as to be accessible by the user not at the end of the fork but at the top of the handle. A removable cap (B) blocks the electronic card and particularly its USB connection end (25), which in this form is placed at the end of the card and not laterally. As represented in FIG. 8, this particular layout enables an antenna (A) to be housed, which is useful in a connectivity version of the BLUETOOTH communications protocol type. In this version, the tool (O) handle is notched on the top by an opening or indentation (E) so as to allow waves transmitted and received by antenna (A) to pass without disruption. In this version, it is therefore understood that fork functions are controlled by the top of the card and not by the end of the card. FIG. 7 represents a contact track (P) in a second form of the invention in which the contact track has the form of a hollow ring. In this form it is possible to make contact with a spring that slides in translation by bearing against or not bearing against the contact track along the plugging or not of the key inside the oblong fork tool. Of course, other forms of contact are possible. This track form is of interest in that it enables the mechanical layout of the electronic key to be maximized so as to optimize the waterproofness of the electronic key. As represented in FIGS. 9a and 9b, the electronic key is made by the arrangement of two shells that are clipped. The key formed is sealed with two electrical contact points, one with the handle, the other with the fork head, these electrical contacts are formed by a conductive stud mounted on a spring that slides until it touches the hollow ring of the contact track (P). This solution presents another advantage which is that of pressing on the inside of the handle which optimizes the holding of the key inside the handle under the effect of the spring. As represented in FIGS. 9a and 9b, a cap B formed by a hinge-mounted lid blocks the electronic key and ensures waterproofness to protect against, in particular, water entering inside the plug cap, particularly into the USB connector, which should be accessible for reloading, but inaccessible and sealed during the washing step.

The present invention therefore relates to an electronic fork for measuring eating rhythms comprising a conductive fork (F) head with its shoulder and its truncated handle interacting with an electronic card (20) characterized in that, on the conductive fork (F) between the neck of the fork (F) and its shoulder, is overmolded an insulator (11), on the insulated fork (F) and shoulder (11) assembly, an oblong hollow conductive handle (12) is then overmolded, the fork (F) head is insulated from the conductive handle (12), the assembly forms an oblong tool (O) inside of which an electronic key (30) is plugged, the key is made by assembling an insulated shell (32) around an electronic card (20), the electronic card (20) comprises two contact tracks (P1, P2) between which a capacitive sensor detects the closing of the circuit between the contact tracks (P1, P2), two contact blades (31a, 31b) are housed in the shell (32) in contact at one end with the contact tracks (P1, P2) and exiting the shell (32) to be housed in the position in which the key is plugged into the tool, first against the truncated body of the fork (F) and second against the conductive handle (12).

The present invention therefore relates to an electronic fork for measuring eating rhythms characterized in that the top insulated overmolding edge is at least 1 mm and is positioned in the neck of the utensil (F), and in that the axis of the conductive handle (12) adopts an angularity (μ) with the utensil holding angle of between 12° and 22°.

The present invention therefore relates to an electronic fork for measuring eating rhythms characterized in that the tool (O) presents an oblong form that is perforated on the bottom, the electronic key (30) is plugged into the hole at the bottom, the key cooperates with the tool (O) both mechanically and electronically.

The present invention therefore relates to an electronic fork for measuring eating rhythms characterized in that the electronic card (30) forms a cap on the hole of the tool and on the cap, a transparent elastomer shell is formed with user interfaces positioned facing each other, the user interfaces are an On-Off push button (18) and lamps known as warning light-emitting diodes (19).

The present invention therefore relates to an electronic fork characterized in that the electronic key comprises an alarm (29) that is a vibrator and/or a microphone.

The present invention therefore relates to an electronic fork for measuring eating rhythms characterized in that on the side of the lateral electronic card is positioned a socket (25) that passes through the shell (32) and that is connected to the electronic card (20), by fully pushing the key (30) into the tool (O) handle, then the socket (25) is protected by the tool (O) handle.

The present invention therefore relates to an electronic fork for measuring eating rhythms characterized in that the conductive handle (12) of the fork comprises a hole (15) positioned closer to the insulated shoulder and that has two functions, a first function of promoting the flow of water when washing the handle alone without the electronic key, a second function of serving as an attachment clip in cooperation with a complementary protuberance (35) of the electronic key (30) when it is plugged into the hollow of the conductive handle (12).

It is therefore clearly understood that numerous variations of the invention may be part of the present invention.

The invention claimed is:

1. An electronic fork for measuring eating rhythms comprising a conductive fork (F) head with its shoulder and truncated handle interacting with an electronic card (20) characterized in that on the conductive fork (F) between the neck of the fork (F) and its shoulder is overmolded an insulator (11), on the insulated fork (F) and shoulder (11) assembly is then overmolded an oblong hollow conductive handle (12), the fork (F) head is insulated from the conductive handle (12), the fork (F) head, insulated overmolding (11) and conductive overmolding (12) assembly forms an oblong tool (O) inside of which is plugged an electronic key (30) made by assembling an insulated shell (32) around an electronic card (20), the electronic card (20) comprises two contact tracks (P1, P2) between which a capacitive sensor detects the closing of the circuit between the contact tracks (P1, P2), two contact blades (31a, 31b) are housed inside the shell (32) each in contact at one end with the contact track (P1) for the first blade (31a), and (P2) for the second blade (31b) and each exiting the shell (32) to be housed in the position in which the key is plugged into the tool, first against the truncated body of the fork (F) for the first contact blade (31a) and second against the conductive handle (12) for the second contact blade (31b).

2. The electronic fork for measuring eating rhythms according to claim 1 characterized in that the top edge of the insulated overmolding is at least 1 mm and is positioned in the neck of the utensil (F), and in that the axis of the conductive handle adopts an angularity (μ) with the utensil holding angle of between 12° and 22°.

3. The electronic fork for measuring eating rhythms according to claim 1 characterized in that the tool (O) presents an oblong form perforated on the bottom, the electronic key (30) is plugged into the hole at the bottom, the key cooperates with the tool (O) both mechanically and electronically.

4. The electronic fork for measuring eating rhythms according to claim 1 or 3 characterized in that the electronic card (30) forms a cap on the hole of the tool and on the cap, a transparent elastomer shell is formed with user interfaces positioned facing each other, the user interfaces are an On-Off push button (18) and lamps known as warning light-emitting diodes (19).

5. The electronic fork for measuring eating rhythms according to claim 1 characterized in that the electronic key comprises an alarm (29) that is a vibrator and/or a microphone.

6. The electronic fork for measuring eating rhythms according to claim 1 characterized in that on the lateral side of the electronic card is positioned a socket (25) that passes through the shell (32) and is connected to the electronic card (20), by fully pushing the key (30) into the tool (O) handle, then the socket (25) is protected by the tool (O) handle.

7. The electronic fork for measuring eating rhythms according to claim 1 characterized in that the conductive handle (12) of the fork comprises a hole (15) positioned closer to the insulated shoulder and that has two functions, a first function is to promote the flow of water during washing of the handle alone without the electronic key, a second function is to serve as an attachment clip in cooperation with a complementary protuberance (35) of the electronic key (30) when it is plugged into the hollow of the conductive handle (12).

* * * * *